United States Patent Office 3,297,697
Patented Jan. 10, 1967

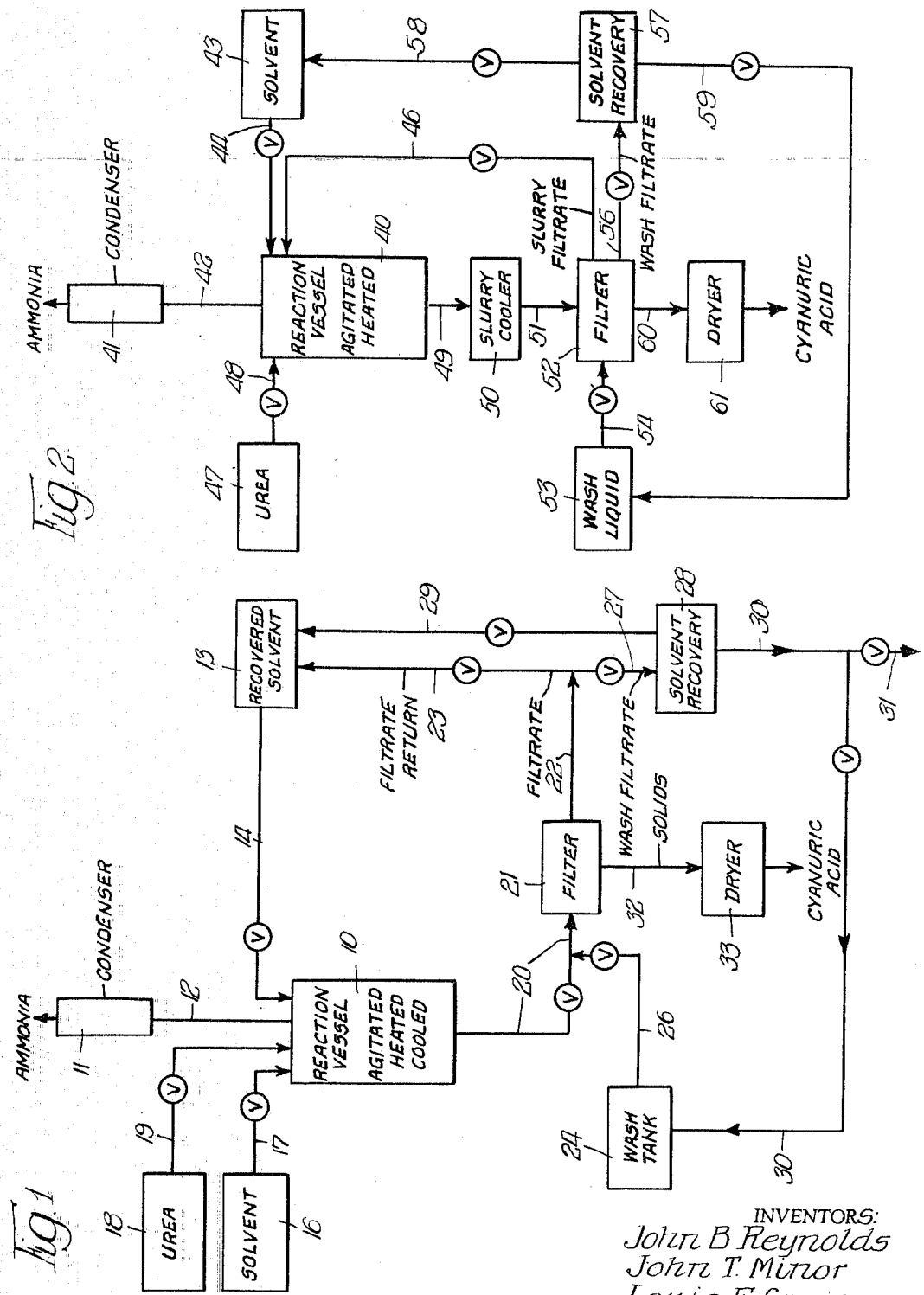

3,297,697
CYANURIC ACID PRODUCTION
John B. Reynolds, Pryor, John T. Minor, Ponca City, and Louis E. Craig, Pryor, Okla., assignors, by mesne assignments, to Nipak, Inc., Dallas, Tex., a corporation of Texas
Filed June 20, 1963, Ser. No. 289,210
13 Claims. (Cl. 260—248)

This invention relates to the preparation of cyanuric acid by the conversion of urea in a suitable solvent by the application of heat. More particularly, the invention is concerned with effecting the conversion of urea in the liquid phase, using a relatively high ratio of solvent to urea, whereby yields of cyanuric acid of higher purity are obtained than by processes known in the prior art wherein the advantage of high solvent-to-urea ratios was not recognized and, consequently, relatively low ratios were used as an economy measure.

Cyanuric acid is useful as an intermediate in the preparation of other chemical compounds; e.g., direct chlorination of cyanuric acid in alkaline solution produces trichlorcyanuric acid which is used in dry bleach compositions. Cyanuric acid is also useful as a selective hebicide, and as a conventional laboratory source of cyanic acid gas.

When urea is heated in a suitable solvent at elevated temperatures, e.g. above 170° C., the urea is largely converted to cyanuric acid which precipitates out and may be recovered by filtration. Broadly speaking, the preparation of cyanuric acid by heating a solution of urea in various solvents is known. For example, United States Patent 2,822,363 discloses preparation of cyanuric acid by heating urea dissolved in a phenolic solvent, such as phenol, cresol, and cresylic acid, and United States Patent 2,872,447 teaches a similar process wherein the solvent is an N-substituted lower acyl amide, such as dimethylformamide. While the yields of cyanuric acid produced by such prior art processes are generally satisfactory, the degree of purity of the product has not been high enough to permit its use, without further purification, in certain important industrial applications, such as in the manufacture of chlorinated derivatives wherein the presence of even small quantities of impurities is very undesirable.

It is the principal object of the invention to provide a process of preparing cyanuric acid by the thermal conversion of urea, wherein the cyanuric acid produced has a purity of at least 98% and thus is acceptable for most industrial uses without further purification. Other objects and advantages of the invention will become apparent from the following specification wherein presently preferred modes of carrying out the process are described.

Broadly speaking, our invention is based on our discovery that, in the production of cyanuric acid by heating urea in a suitable solvent therefor, the proportion of solvent has an important effect on the purity of the cyanuric acid produced, and that by increasing the proportion of solvent beyond that taught by or thought necessary by the prior art a product of greater purity than that produced by the prior art methods is obtained. More specifically, we have found that the purity of cyanuric acid prepared by the thermal conversion of urea in a suitable solvent therefor is considerably enhanced when the ratio of solvent to urea is maintained at at least 4 milliliters of solvent per gram of urea throughout the period of conversion.

Our discovery of the desirable effect of increasing proportions of solvent on the purity of the cyanuric acid product was unexpected in view of the fact that in the processes of the prior art the proportion of solvent was not considered critical, and the primary factors determining the quantity of solvent used in such processes were the ability of the solvent to dissolve the urea, and its presence in sufficient quantity to provide efficient heat transfer throughout the solution. Because the prior art processes did not recognize the effect of the proportion of solvent on the purity of the cyanuric acid produced, the proportions of solvent employed by the prior art were usually maintained at a low value as an economy measure.

Our improved process may be conducted in several different ways. For example, it may be conducted as a batch process, wherein the solvent and urea are mixed in the desired ratio and the resulting solution heated until the conversion of urea to cyanuric acid is complete. This process may be practiced semi-continuously by adding urea slowly and continuously to the solvent system maintained at a suitable temperature. In the semi-continuous process the urea is added to the solution approximately at the same rate that the urea already in solution is converted to cyanuric acid, the cyanuric acid precipitating as it is produced, whereby the ratio of solvent to urea is maintained at the desired high level.

The process may also be conducted continuously, in which case the urea and solvent are continuously added to a reaction vessel, with the ratio of solvent to urea being maintained at the aforementioned desired high level, the cyanuric acid slurry is removed continuously from the vessel and filtered for recovery of the precipitated cyanuric acid, and the recovered solvent is recycled to the vessel for re-use in dissolving additional urea.

In the accompanying drawings:
FIGURE 1 is a flow-diagram of a semi-continuous process in accordance with the invention; and
FIGURE 2 is a flow-diagram of our improved continuous process.

In the flow-diagram of FIGURE 1, the reference numeral 10 refers to a conventional closed reaction vessel equipped with an agitator and externally jacketed or fitted internally with coils for the passage of steam or water for regulating the temperature of the contents of the vessel in known manner. The reaction vessel is preferably fabricated of material such as stainless steel, glass, or the like, which is resistant to attack by the reactants, the solvent and the reaction products. The reaction vessel is provided with a reflux condenser 11, to which it is connected by means of a conduit 12. Solvent from a previous reaction (fresh solvent in the first run of a series) is introduced to the reaction vessel 10 from a storage tank 13 through a conduit 14, fresh solvent being added, if necessary, from a supply tank 16 through a conduit 17. The solvent in the reaction vessel is heated to a suitable temperature, e.g., about 200° to 245° C. Urea, either solid or molten, from a supply bin or heated tank 18 is added by means of a conveyor or conduit 19 to the reaction vessel 10, the quantity of urea initially added to the vessel being such that the ratio of solvent to urea is relatively high, e.g., at least about 4 ml. of solvent per gram of urea. If desired, these initial quantities of solvent and urea may be heated together without further additions thereto, and the cyanuric acid produced may be worked up in the manner hereinafter described. However, preferably, after such initial addition of urea, a further quantity of urea is added at a rate corresponding to cyanuric acid formation in the reaction vessel, thereby maintaining the solvent-to-urea ratio of at least about 4 ml. of solvent per gram of urea, the cyanuric acid precipitating from solution as it is formed, and the reaction temperature being maintained at about 200° to 245° C. The condenser 11 is maintained at a suitable relatively low temperature, e.g., about 80° C., to condense the solvent evaporated from the reactor, but allowing the ammonia formed in the reaction to pass through. If desired, the ammonia may be recovered by any conventional means (not shown).

After the desired total amount of urea has been added to the reaction vessel, as determined by the formation of a slurry of cyanuric acid and solvent containing a precipitated solids content of, for example, about 40% by weight on the wet basis, the addition of urea is stopped and the temperature of the reaction mixture is maintained at about 200° to 245° C. for an additional period, e.g., about twenty minutes, to continue the conversion to cyanuric acid of urea remaining in solution. The slurry in the reaction vessel 10 formed by the precipitation of cyanuric acid is then cooled, preferably to less than 60° C., and conducted through a conduit 20 to a filter 21 from which the solvent filtrate, which contains some dissolved unconverted urea and intermediates such as biuret, in addition to some dissolved cyanuric acid, is conducted by a conduit 22 and a filtrate-return conduit 23 to the recovered solvent tank 13. After separation of the solvent from the slurry as just described, a suitable wash liquid such as methanol or acetone is supplied to the filter 21 from a wash liquid supply tank 24 through a conduit 26 to wash the filter cake retained in the filter. The wash liquid leaving the filter 21 is conveyed through conduits 22 and 27 to a solvent recovery unit 28 of conventional design, e.g., a fractionator, from which recovered solvent is returned to the recovered solvent tank 13 through a conduit 29. The wash liquid recovered in unit 28 is returned to the tank 24 through a conduit 30. When the wash liquid is an inexpensive material, such as water, it may be discharged through conduit 31 to waste. The washed cyanuric acid is conveyed from the filter 21 by means of a chute or conventional conveyor 32 to a dryer 33 from which it is discharged for packaging or storage in the desired dried condition.

In the flow diagram of FIGURE 2, there is depicted diagrammatically a reaction vessel 40 which may be similar to the vessel 10 previously described, provided with a reflux condenser 41 to which the vessel is connected by a conduit 42. A urea solvent is continuously introduced into the vessel 40, either from a solvent storage tank 43 by means of a conduit 44, or through a recirculating conduit 46, or both, and the solvent is heated in the vessel 40 to a suitable temperature, e.g., about 200° to 245° C. The solvent in the vessel 40 is preferably saturated with cyanuric acid, which is the condition of the solvent recirculated through conduit 46, as will later appear. However, fresh solvent added to the vessel 40 from tank 43 quickly becomes saturated with cyanuric acid under the conditions existing in the reaction vessel during the reaction wherein urea is converted to cyanuric acid, as previously described.

Urea is continuously conveyed in solid or molten form from a bin or heated tank 47, through a conduit 48 to the vessel 40, and the rate of addition of urea is coordinated with the flow of solvent into the vessel so that the ratio of solvent to urea in the vessel 40 is maintained relatively high, e.g., at least about 4 ml. of solvent per gram of urea, the ratio being calculated on the basis of cyanuric acid-free solvent. Preferably, the residence time of the urea and solvent in the reaction vessel is such that the reaction in which urea is converted to cyanuric acid is substantially complete under the conditions maintained in the vessel—e.g., about one hour at a temperature of 245° C., using cresol as the solvent and a ratio of about 6 ml. of cresol to one gram of urea. The conversion reaction proceeds more rapidly at higher temperatures than at lower temperatures, and therefore the residence time of the urea and solvent in the reaction vessel is influenced by the reaction temperature selected within the operative temperature range for the conversion reaction, and by the degree of conversion of urea to cyanuric acid desired during the conversion period.

Consistent with the aforementioned residence time, the rate of addition of urea to vessel 40 is maintained substantially equal to the rate at which urea is converted to cyanuric acid. The condenser 41 is maintained at a suitable relatively low temperature, e.g., about 80° C., to condense the solvent evaporated from the reaction vessel, but allowing the ammonia formed in the reaction to pass through the condenser.

The slurry formed by precipitation of the cyanuric acid in the solvent is continuously conducted by means of a conduit 49 from the vessel 40 to a conventional cooling vessel 50 where the slurry is suitably cooled, i.e., to about 60° C., to reduce the solubility of cyanuric acid in the solvent. From the cooler 50 the slurry is conducted through a conduit 51 to a filter 52 of conventional construction, preferably having intermittent filtering and washing cycles such as the Superdehydrator filter. The filtrate obtained from the filtering cycle of the filter 52 comprises the initial solvent, now saturated with cyanuric acid and also containing some dissolved unconverted urea and intermediates such as biuret, and this filtrate is returned to vessel 40 through the conduit 46.

After the filtering cycle, a suitable wash liquid such as methanol or acetone, is conducted from a tank 53 through a conduit 54 to the filter 52, the wash liquid passing from the filter and through a conduit 56 to a conventional solvent recovery unit 57, such as a fractionator, which separates the entrained solvent from the wash liquid. The recovered solvent is conveyed from the solvent recovery unit 57 to the solvent storage tank 43 via a conduit 58, and the recovered wash liquid is returned from the recovery unit 57 to the wash liquid tank 53 by means of a conduit 59.

The washed cyanuric acid is conveyed from the filter 52 through a suitable conduit or conveyor 60 to a dryer 61 from which it is discharged for packaging or storage in the desired dried condition.

In any of the processes represented by the flow diagrams in FIGURES 1 and 2, the urea may be preliminarily dissolved in part of the solvent before it is introduced into the reaction vessels 10 or 40. Also, instead of filtering the cyanuric acid slurry and washing the filter cake in the same filter, as described above, the cyanuric acid filter cake collected in the filters 21 or 52 may be removed therefrom, then slurried with the wash liquid and refiltered in a separate filter.

The solvents suitable for use in the present process may be any solvent for urea which has a sufficiently high boiling point to permit the liquid reaction mixture to be maintained at a proper temperature for conversion of the urea to cyanuric acid. Accordingly, the solvent should have a boiling point of 175° C., or above, to be most useful. Lower-boiling solvents may be used, but they would require the use of pressure equipment in order to bring the reaction temperature to the optimum levels.

Since the use of pressure equipment introduces complications, including increased difficulty in dealing with the ammonia released in the conversion reaction, such lower-boiling solvents are not preferred. It is of course possible to use such lower-boiling solvents in the conversion reaction at atmospheric pressure, but this would require correspondingly longer reaction times to bring about the desired conversion, which also is not desirable. The solvents should also be stable towards heat and oxidation, and should not react substantially with urea, ammonia, or cyanuric acid to give undesirable by-products. Solvents which react with urea, ammonia, or cyanuric acid may be used, however, if the reaction product continues to be a good urea solvent, and has the other required properties mentioned above. The solvent must also be liquid at the operating temperature of the conversion reaction and, preferably, should be liquid at room temperature for handling ease.

Examples of suitable solvents are the tetra(lower)-alkylureas, such as tetramethylurea and tetraethylurea; phenolic solvents such as cresol, xylenol, and cresylic acid; substituted amides such as di(lower)alkylformamides, e.g., dimethylformamide and dibutylformamide; dimethylacetamide; and glycol ethers, such as diethylene glycol monomethyl ether, and dipropylene glycol monomethyl ether.

The preferred temperature range for the conversion reaction is rather wide, for example, between about 170° and 275° C., and more preferably between about 200° and 245° C. Reaction temperatures below about 175° C. are also operative but are not recommended because the reaction proceeds more slowly as the temperature decreases. Reaction temperatures above 275° C. may also be used, but the solvents are subject to decomposition and discoloration at higher temperatures, which effects become progressively greater as the temperature increases and should be avoided.

The wash liquid for the precipitated cyanuric acid may be any liquid which is miscible with the solvent used in the process, but which is not substantially reactive with cyanuric acid and is a non-solvent or very poor solvent for cyanuric acid. The water, methanol, and acetone mentioned in the foregoing description are examples of suitable wash liquids for use in the process employing one or more of the above-mentioned solvents. Obviously, other wash liquids may be used, and their identity readily determined by those skilled in the art familiar with the above-mentioned requirements of the wash liquid.

In the following examples a number of trials are set forth showing the thermal conversion of urea to cyanuric acid in a solvent medium, using the high solvent-to-urea ratios in accordance with the invention, and also showing, for the purpose of comparison, conversion reactions wherein low ratios of solvent to urea are used consistent with prior art practice. The data in Table 1 illustrate the beneficial effect of the higher solvent-to-urea ratios on the purity of the cyanuric acid produced.

EXAMPLES 1 TO 20

In each of these examples, the reaction was carried out in a test tube 16″ long and 2¼″ in diameter. In each instance, about 50 ml. of the mixture of urea and solvent was placed in the test tube and the test tube placed in an oil bath at 245° C. The tubes remained in the bath for the indicated periods of time, after which they were removed and the contents cooled to about 30° C. The slurries formed in the tubes by precipitation of cyanuric acid were mixed with equal volumes of methanol to facilitate handling and filtration, and the slurries were then filtered. After washing the filter cakes well with methanol, the products were dried in an oven at about 110° C. to constant weight. The products were analyzed for cyanuric acid and ammelide. The results are tabulated below in Table 1.

*Table 1*

CRESOL (USP) AS SOLVENT

| Example | Ratio, Ml. Solvent/G. Urea | Time, Hrs. | Product Assay | |
|---|---|---|---|---|
| | | | Cyanuric Acid, Percent | Ammelide, Percent |
| 1 | 1 | 1 | 87.1 | 11.1 |
| 2 | 2 | 1 | 95.3 | 4.5 |
| 3 | 2 | 1 | 96.2 | 4.2 |
| 4 | 6 | 1 | 99.8 | <0.2 |
| 5 | 6 | 1 | 99.3 | <0.2 |

TETRAMETHYLUREA AS SOLVENT

| | | | | |
|---|---|---|---|---|
| 6 | 1 | 1 | 68.2 | 12.3 |
| 7 | 1 | 1.5 | 83.3 | 8.0 |
| 8 | 1.6 | 1.5 | 95.5 | 1.9 |
| 9 | 1.6 | 1.5 | 94.4 | 1.5 |
| 10 | 4 | 1.5 | 99.6 | 0.2 |
| 11 | 6 | 1.5 | 99.7 | <0.02 |
| 12 | 6 | 1.5 | 99.7 | <0.02 |

DIETHYLENE GLYCOL MONOMETHYL ETHER SOLVENT [1]

| | | | | |
|---|---|---|---|---|
| 13 | 1 | 1 | 85.7 | 12.7 |
| 14 | 1 | 1 | 82.6 | 15.6 |
| 15 | 2 | 1 | 93.6 | 3.8 |
| 16 | 2 | 1 | 92.9 | 6.3 |
| 17 | 6 | 1 | 98.2 | <0.1 |

DIPROPYLENE GLYCOL MENOMETHYL ETHER SOLVENT [1]

| | | | | |
|---|---|---|---|---|
| 18 | 1 | 1 | 79.0 | 15.7 |
| 19 | 2 | 1 | 91.2 | 7.4 |
| 20 | 10 | 1 | 98.7 | 0.04 |

[1] The solvents used in these reactions had previously been used to prepare cyanuric acid from urea. The glycol ether solvents react with some urea the first time they are used. The true solvents in Examples 13 to 20 are therefore believed to be largely carbamates of the respective glycol ethers.

EXAMPLE 21

In a 500 ml. three-necked flask fitted with a reflux condenser, stirrer and thermometer, was placed 120 g. of urea and 120 ml. of dimethylformamide. With stirring, the reaction mixture was heated at reflux (172–175° C.) for 6 hours. The resulting slurry was cooled to about 30° C. and the product collected by filtration, washed well with acetone, and dried at about 110° C. to constant weight. The result was 69.3 g. (81% of theory as cyanuric acid) which assayed 95.2% cyanuric acid and contained 3.8% ammelide.

EXAMPLES 22 TO 30

The procedure of Example 21 was used, with some variation in temperature and reaction times (because of the different solvents and solution concentrations), with both dimethylformamide and diethylacetamide solvent and varying ratios of solvent to urea. In all these examples the reflux temperatures were used, which for dimethylformamide reached a maximum of 172° C., and for diethylacetamide reached a maximum of 200° C. The results are tabulated in Table 2.

Table 2

DIMETHYLFORMAMIDE AS SOLVENT [1]

| Example | Ratio, Ml. Solvent/G. Urea | Time, Hrs. | Product Assay | |
|---|---|---|---|---|
| | | | Cyanuric Acid, Percent | Ammelide, Percent |
| 22 | 6 | 4 | 99.1 | 0 |
| 23 | 6 | 4 | 99.6 | 0 |

DIETHYLACETAMIDE AS SOLVENT [1]

| 24 | 2 | 3 | 89.8 | 0.02 |
|---|---|---|---|---|
| 25 | 2 | 3 | 96.5 | 0.16 |
| 26 | 2 | 3 | 96.9 | 0.43 |
| 27 | 2 | 1.5 | 98.2 | 0.55 |
| 28 | 6 | 1.5 | 100.0 | 0 |
| 29 | 6 | 1.5 | 100.0 | 0 |
| 30 | 6 | 1.5 | 99.9 | 0 |

[1] Saturated with cyanuric acid.

NOTE.—Examples 24–27 and Examples 28–30 comprised two series of runs in which the solvent used in a particular run was that recovered from the previous run in its series.

EXAMPLE 31

In a 12-liter flask containing 3000 ml. of diethylene glycol monomethyl ether solvent from a previous cyanuric acid preparation, agitated and heated at 220° C., was added continuously a solution of 3000 g. of urea in 3000 ml. of the same solvent. The urea solution was maintained at about 110° C. while it was being added and was added over a period of 3 hours and 40 minutes. The temperature of the flask contents was maintained at 215–220° C. during the addition. Cyanuric acid precipitated as it was formed during this time. The 215–220° C. temperature of the reaction mixture was maintained another 20 minutes. The slurry was cooled to about 70° C. and the product was collected by filtration. After washing thoroughly with water, the product was dried in an oven at 110° C. The resulting product, 2016 g. (94% of theory), assayed 99.6% cyanuric acid.

EXAMPLE 32

The procedure of Example 31 was repeated, except that 4000 g. of urea in solution in 3000 ml. of solvent were added to the initial 3000 ml. of solvent over a period of 4 hours and 24 minutes. The 215–220°C. temperature of the reaction mixture was maintained for an additional 30 minutes following the addition of urea, and the product isolated as in Examples 1 to 20. The yield was 2708 g. (94.5% of theory) of cyanuric acid, which assayed 98.5%.

EXAMPLE 33

In a 500 ml. flask containing 240 ml. of dipropylene glycol monomethyl ether solvent from a previous run, at reflux, and with agitation, was added intermittently and in small portions 120 g. of urea. The addition was carried out over a 2 hour period. A suitable rate of addition of the urea under the circumstances of this example is about 10 g. for 10 min. The reaction mixture was heated at reflux an additional 30 minutes. The temperature reached 226° C. near the end of the reaction. The solid product was collected and handled as in Example 31 to give 77.4 g. (90% of theory). Analysis showed no ammelide and 99.3% cyanuric acid.

EXAMPLE 34

To a 22-liter flask fitted with a stirrer and reflux condenser was added 5000 g. of urea and 11,000 ml. of diethylene glycol monomethyl ether solvent previously used in making cyanuric acid from urea by the method of the inveniton. Heat was applied to the agitated mixture until vigorous reflux was achieved. The stirred reaction mass was heated at reflux until ammonia evolution had stopped. The temperature of the reaction mixture was 226° C. at the end of the reaction. The reaction mixture was cooled to 70° C. and the product collected by filtration. After washing thoroughly with water and then with acetone, the product was dried in an oven at about 110° C. to constant weight to give 2,810 g. of cyanuric acid (87.1% of theory) of 90.8% purity.

The exposure of the solvents to the atmosphere at the highest temperatures of the reaction is apt to cause discoloration of the solvent, with some of the color being imparted to the final product, and for this reason, as well as to improve handling ease, the reaction mixture (slurry) is cooled after the conversion reaction. However, if a closed system is used which prevents exposure of the hot solvent to the atmosphere, cooling of the final reaction mixture is not necessary.

The foregoing examples demonstrate the effect of the ratio of solvent to urea on the purity of the cyanuric acid produced. Thus, in Examples 4, 5, 10–12, 17, 20, 22, 23, 28, and 29 to 33, in which initial ratios between about 4 and 10 milliliters of solvent to 1 gram of urea (or higher) were used, the cyanuric acid had a purity higher than 98%. On the other hand, in Examples 1 to 3, 6 to 9, 13 to 16, 18, 19, 21, 24 to 27, and 34, in which initial ratios of between 1 and 2.2 milliliters of solvent to 1 gram of urea were used, the purity of the cyanuric acid in only one instance was as high as 98.2%, and in that instance the ammelide content was 0.55%.

In Examples 31 and 32, although the overall ratio of solvent to urea was only between 2 and 1.5 milliliters of solvent to 1 gram of urea, respectively, the urea was added slowly over a long period of time, the urea in solution being continually converted to cyanuric acid as fresh urea was being added, so that at any given instant the ratio of solvent to urea in the reactor was greater than 4 milliliters of solvent per gram of urea. The same general conditions existed in the process of Example 33.

Although the lower limit of the initial ratio-range of solvent to urea is about 4 milliliters of solvent per gram of urea, no more than 10 milliliters of solvent per gram of urea would appear to be necessary, although this higher ratio is exceeded by the procedures of Examples 31 to 33, wherein urea was added continuously to the hot solvents. In these latter examples, since the urea was being decomposed or converted to cyanuric acid nearly as rapidly as it was being added, the ratio of solvent to unreacted urea at any given time was very high.

In those embodiments of the present process wherein urea is continuously added to the reaction mixture as cyanuric acid is precipitated, whereby slurries are produced having a high concentration of cyanuric acid, the desirability of having an easily stirred and filtrable final reaction mixture imposes a practical limit on the amount of urea which should be treated by a given total amount of solvent. In our experience a slurry of cynauric acid and solvent containing about 40% by weight of precipitated cyanuric acid in the solvent, calculated on the wet basis, represents about the maximum concentration of solids in the slurry which still allows for easy stirring and filtration of the slurry, and we therefore prefer to coordinate the total amounts of urea and solvent used in such reactions to yield a slurry having a concentration of cyanuric acid solids no greater than about 40% by weight.

We claim:

1. In a process for producing cyanuric acid by heating urea in a solvent therefor at a temperature effective to convert the urea to cyanuric acid, the improvement therein which comprises maintaining a ratio of at least 4 ml. of solvent per gram of urea throughout the heating period.

2. The process in accordance with claim 1, wherein said solvent is present in the amount of between about 4 ml. and 10 ml. per gram of urea.

3. The process in accordance with claim 1, wherein said solvent consists essentially of a member of the group consisting of tetra(lower)alkylureas, cresol, xylenol, cresylic acid, di(lower)alkylformamides, dimethylacetamide, diethylene glycol monomethyl ether, and dipropylene glycol monomethyl ether.

4. In a process for producing cyanuric acid by heating urea in a substantially inert solvent therefor in which cyanuric acid is not more than slightly soluble, at a temperature effective to convert the urea to cyanuric acid, the improvement which comprises the steps of heating at said temperature a mixture of urea and said solvent wherein the ratio of solvent to urea at the commencement of said heating step is at least about 4 ml. of solvent per gram of urea, and adding urea to said heated solvent mixture at a rate substantially equal to the rate at which the urea in solution is being converted to cyanuric acid.

5. A process in accordance with claim 4, wherein said solvent consists essentially of a member of the group consisting of tetra(lower)alkylureas, cresol, xylenol, cresylic acid, di(lower)alkylformamides, dimethylacetamide, diethylene glycol monomethyl ether, and dipropylene glycol monomethyl ether.

6. The process in accordance with claim 4, wherein the total amount of urea used is such that the slurry formed by precipitation of cyanuric acid in the solvent contains precipitated solids in an amount no greater than about 40% by weight on the wet basis.

7. A continuous process for producing cyanuric acid which comprises preparing an initial solution of urea in a substantially inert solvent stable to heat and oxidation but in which cyanuric acid is not more than slightly soluble, the ratio of solvent to urea in said solution being at least about 4 ml. of solvent per gram of urea, heating said solution at a temperature effective to convert the dissolved urea to cyanuric acid, continuously adding urea to said heated solution at a rate substantially equal to the rate at which urea in solution is being converted to cyanuric acid while maintaining the aforementioned temperature, said cyanuric acid precipitating out of said solution to form a slurry therewith, continuously removing portions of said slurry, continuously separating precipitated cyanuric acid from the said removed portions of slurry, and continuously returning the resulting mother liquor to said heated solution.

8. A continuous process for producing cyanuric acid which comprises the steps of continuously adding urea to a body of inert solvent therefor which is stable to heat and oxidation but in which cyanuric acid is not more than slightly soluble, continuously maintaining the resulting solution at a temperature effective to convert dissolved urea to cyanuric acid, said cyanuric acid precipitating from said solution as it is formed, the ratio of solvent to urea in said solution being maintained throughout said conversion step at least about 4 ml. of solvent per gram or urea, continuously removing a cyanuric acid-solvent slurry from said body of solvent, continuously separating said cyanuric acid component from said slurry and continuously returning the resulting mother liquor to said body of solvent.

9. A process in accordance with claim 8, wherein said solvent consists essentially of a member of the group consisting of tetra(lower)alkylureas, cresol, xylenol, cresylic acid, di(lower)alkylformamides, dimethylacetamide, diethylene glycol monomethyl ether, and dipropylene glycol monomethyl ether.

10. The process in accordance with claim 8, wherein the urea added to said solvent is preliminarily dissolved in a portion of said solvent.

11. A continuous process for producing cyanuric acid which comprises the steps of continuously adding urea and an inert solvent therefor to a reaction vessel, said solvent being stable to heat and oxidation and not being a substantial solvent for cyanuric acid, said solvent and urea being added in a ratio of at least about 4 ml. of solvent per gram of urea, maintaining the resulting solution in said reaction vessel at a temperature effective to convert the dissolved urea to cyanuric acid, said cyanuric acid precipitating from said solution as it is formed, continuously removing a slurry of solvent and cyanuric acid from said reaction vessel, continuously separating cyanuric acid from the solvent component of said slurry, and continuously returning the separated solvent component of said slurry to said reaction vessel as the solvent for the fresh urea being continuously added to said reaction vessel.

12. A process in accordance with claim 11, wherein said solvent consists essentially of a member of the group consisting of tetra(lower)alkylureas, cresol, xylenol, cresylic acid, di(lower)alkylformamides, dimethylacetamide, diethylene glycol monomethyl ether, and dipropylene glycol monomethyl ether.

13. The process in accordance with claim 11, wherein at least a portion of the urea initially added to said reaction vessel is added in the form of a solution in said solvent.

References Cited by the Examiner
UNITED STATES PATENTS

| | | | |
|---|---|---|---|
| 2,822,363 | 2/1958 | Christmann et al. | 260—248 |
| 2,975,177 | 3/1961 | Christmann | 260—248 |

FOREIGN PATENTS

| | | |
|---|---|---|
| 873,297 | 7/1961 | Great Britain. |

WALTER A. MODANCE, *Primary Examiner.*

J. M. FORD, *Assistant Examiner.*